Patented Dec. 14, 1943

2,336,921

UNITED STATES PATENT OFFICE 2,336,921

FLUORINE COMPOUND

Anthony F. Benning, Woodstown, N. J., and Joseph D. Park, Wilmington, Del., assignors to Kinetic Chemicals, Inc., Wilmington, Del., a corporation of Delaware No Drawing. Application December 13, 1941, Serial No. 422,871

6 Claims. (Cl. 260—614)

A. This invention relates to 2,2,2-tri-fluoro-ethyl-ethyl ether and to fluoro-alkyl-alkyl ethers containing the group $CF_3$, and to a method of preparing them.

B. It has heretofore been proposed by Swarts, Centr. (1901) II 804 and (1911) II 848 to make ethers from fluoro brom ethanes. The reaction of the chlor compounds does not proceed according to the conditions prescribed by Swarts.

C. It is an object of the invention to prepare the fluoro ethers from fluoro-chlor aliphatic hydrocarbons. Another object of the invention is to prepare ethers having the group $CF_3$, and particularly 2,2,2-tri-fluoro-ethyl-ethyl ether.

D. The objects of the invention are accomplished, generally speaking, by reacting a fluoro-chloro-alkane with an alkali metal alkoxide at a temperature between about 100° C. and about 175° C. under pressure.

E. In carrying out the preferred form of the reaction one of the reagents is a tri-fluoro-alkyl chloride having the group $CF_3$ and one or more groups $CH_2$. The number of $CH_2$ groups may range up to eleven, but above five there is some tendency for side reactions to occur. Among the compounds of this type are tri-fluoro-ethyl chloride, tri-fluoro-propyl chloride and tri-fluoro-butyl chloride. The other reactant is an alkali metal alkoxide, in which the alkyl group may have from one to twelve carbon atoms but has preferably from one to six. The alkali metal is preferably sodium but may be any of the others, although the substitution of others should be attended by modifications in the reaction conditions designed to produce optimum results. Among the more useful of these groups are sodium propoxide and sodium butoxide. Sodium thioalkoxides may also be used where thio ethers containing fluorine are desired.

F. The following example is illustrative of the reaction:

*Example*

About 10 parts by weight of $C_2H_5ONa$ in 90 parts by weight of absolute alcohol were reacted with 40 parts by weight of $CF_3CH_2Cl$ at 130° C. for 55 hours in a steel bomb. The reaction products were poured into water ice mixture, washed and dried. A yield of about 25% of $CF_3CH_2OC_2H_5$ was obtained. This material had a boiling point of 78.7° to 79.5° C. The molecular weight of this material determined cryoscopically was found to be 130 as compared to a calculated value of 128.

G. In general it is desirable to carry out the reaction in liquid phase and in the absence of water. Consequently, non-aqueous solvents, such as absolute alcohol and anhydrous saturated hydrocarbons may be used as reaction media.

H. Economically this invention is better than the method of producing ethers of this type by the use of fluoro-brom derivatives. Another advantage is the production of new and useful compounds such as $CF_3CH_2OC_2H_5$, $CF_3CH_2CH_2OC_2H_5$, and $CF_3CH_2OC_3H_7$. These new compounds have a variety of commercial uses. Some of them are excellent refrigerants and solvents.

I. As many apparently widely different embodiments of this invention may be made without departing from the spirit and scope thereof, it is to be understood that we do not limit ourselves to the specific embodiments thereof except as defined in the appended claims.

We claim:

1. The compound represented by the formula $CF_3CH_2OC_2H_5$.

2. The compounds represented by the formula $CF_3(CH_2)_nOC_2H_5$, in which $n$ is a digit from 1 to 5.

3. The process of preparing 2,2,2-trifluoro-ethyl-ethyl ether which comprises reacting 2,2,2-trifluoro-1-chlor-ethane with an alkali metal ethoxide at elevated temperature under pressure.

4. The process of preparing $CF_3CH_2OC_2H_5$ which comprises reacting 10 parts by weight of $C_2H_5ONa$ in alcohol solution with about 40 parts by weight of $CF_3CH_2Cl$ at about 130° C. under pressure, drowning the products of the reaction in cold water, washing and drying them.

5. A trifluoroalkyl-alkyl-ether having a boiling point of 78.7° to 79.5° C. and a molecular weight, determined cryoscopically, of 130.

6. The process of preparing trifluoro-alkyl-alkyl ethers which comprises reacting an alkali metal alkoxide with $CF_3(CH_2)_nCl$, in which $n$ is an integer from the group consisting of 1 to 5, under pressure and at a temperature between about 100° C. and 175° C.

ANTHONY F. BENNING.
JOSEPH D. PARK.